Sept. 20, 1955  J. M. PETERS  2,718,402
CHUCK
Filed Oct. 28, 1950  2 Sheets-Sheet 1
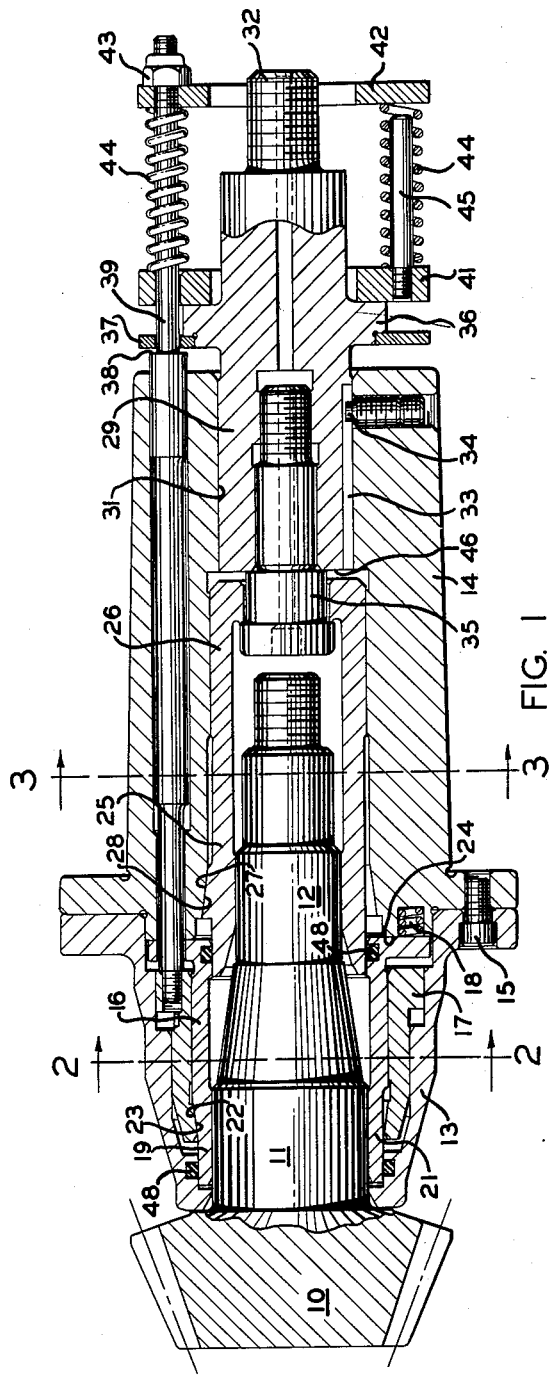
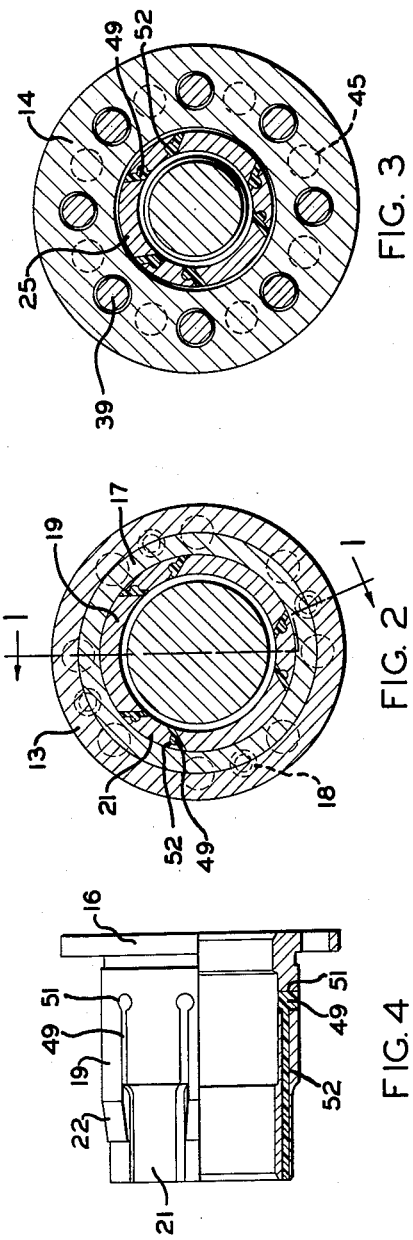
INVENTOR.
JOSEPH M. PETERS
BY Richard W. Treverton
ATTORNEY Sept. 20, 1955  J. M. PETERS  2,718,402
CHUCK Filed Oct. 28, 1950  2 Sheets-Sheet 2

INVENTOR.
JOSEPH M. PETERS
BY Richard W. Treverton
ATTORNEY

United States Patent Office 2,718,402
Patented Sept. 20, 1955

2,718,402
CHUCK

Joseph M. Peters, Rochester, N. Y., assignor to The Gleason Works, Rochester, N. Y., a corporation of New York Application October 28, 1950, Serial No. 192,793

17 Claims. (Cl. 279—50)

The present invention relates to chucks for shank pinions and similarly shaped work pieces. The primary objective is to provide a positively releasing chuck, operated by a single draw bar, which will grip and center accurately two axially spaced portions of the work piece even though either one or both of these portions varies considerably from the nominal diameter. A further objective is to provide a chuck of this kind which will draw the work in, so that it will seat tightly against the front face of the chuck, as draw bar pull is applied.

According to the invention two contractible devices for gripping the work are arranged in axially spaced relation to each other within the body of the chuck. Each of these devices includes a member which has only a little or no motion relative to the body and a movable member which is shifted rearwardly relative to the first member in one direction, to contract the device, and in the opposite direction to expand it. A chuck actuating element, adapted to be shifted in the chuck body by the draw bar, is so arranged that when shifted forwardly it positively moves the movable members of the contractible devices forwardly, thereby expanding these devices and releasing a work piece that has been held by them. When the actuating element is shifted rearwardly it pulls the movable members in the same direction, to thereby contact the devices and grip a work piece; and, as it does so, it slightly shifts at least one of the contractible devices rearwardly, thereby drawing the head of the work piece tightly against the front face of the chuck body.

An equalizing connection is employed between the chuck actuating element and the movable members of the two contractible devices, so that the latter may contract varying amounts in chucking different work pieces, which, although of the same nominal size, often differ in shank diameters by several thousandths of an inch. In one form of the invention this equalization is provided by a spring connection between the actuating element and the movable member of the front contractible device, while in another form of the invention it is provided by equalizing levers. These levers are fulcrumed upon the actuating element and have their end portions arranged to distribute the rearward movement of the actuating element to the movable members of the front and rear contractible devices.

In both forms of the invention the rearward motion is applied to the movable member of the front contractible device by means of circularly arranged rods which extend forwardly from the movable member through openings in the tubular body of the chuck. In the first form of the invention the spring connection between the clutch actuating element and the rods comprises coil springs compressed between abutments on the rods and a ring which extends around the actuating element and has openings passing the rods. In the other form of the invention the ring directly engages the abutments on the rods, being disposed between the latter and the outer ends of the equalizing levers.

The foregoing and other objects and advantages will appear from the following detailed description in the drawings:

Fig. 1 is a longitudinal sectional view taken approximately on line 1—1 of Fig. 2, through one embodiment of the invention;

Figs. 2 and 3 are transverse sections taken approximately on lines 2—2 and 3—3 of Fig. 1;

Fig. 4 is a detail view, partly in elevation and partly in section, of one of the parts shown in section in Fig. 2.

Fig. 5 is a fragmentary longitudinal sectional view, taken in planes similar to those in which Fig. 1 is taken, but showing an alternative form of the invention;

Fig. 7 is a fragmentary longitudinal sectional view, also taken in planes similar to those in which Fig. 1 is taken, but showing a further modification.

Figure 5:
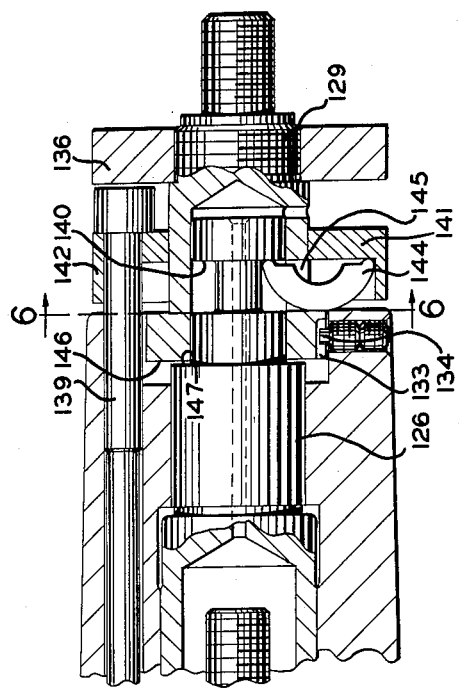

Shown in Figs. 1 to 3 is a chuck designed to hold in the work spindle of a gear cutting machine a pinion that has a head 10 and a shank with axially spaced cylindrical surfaces 11 and 12 of different diameters. The chuck has a two-part tubular body including a nose section 13 and a tail section 14, the latter being tapered to fit into the machine work spindle, not shown. The sections are secured together by screws indicated at 15. The pinion shank surface 11 is held in a contractible device comprising a flexible collet 16 and a contracting member designated 17. This member is tubular in form and is slidable axially upon an internal cylindrical surface of the section 13. The collet has a flanged portion backed by coil springs 18 which constantly urge it forwardly, and it also has forwardly extending active fingers 19 and dummy fingers 21. The active fingers have tapered external surfaces 22 which converge forwardly (toward the left in Fig. 1) and are complementary to a conical inner surface 23 provided on member 17.

The arrangement is such that when the member 17 is moved forwardly the collet 16 expands to its normal condition, in which the fingers 19 free the pinion shank surface 11, and the springs 18 urge the collet to its foremost position. As the member 17 is moved rearwardly the springs 18 tend to hold collet 16 forwardly, so that at first the surface 23 acts upon surfaces 22 to wedge the fingers 19 radially inwardly against the work piece surface 11, thereby centering and gripping the latter. During continued rearward movement of the member 17, the collet 16 and the work will move rearwardly with it until the head 10 of the work piece seats firmly against the forward surface of nose section 13 and the rear flange of the collet rests on surface 24 of body member 14. Thereafter the grip on the work piece can only fully tighten, this limiting the rearward motion of member 17.

The surface 12 of the work is similarly gripped and pulled into the chuck by active fingers 25 of a rear flexible collet 26 when the latter is moved rearwardly. These fingers 25 have rearwardly converging external tapered surfaces 27 which engage a complementary internal conical surface 28 of the body section 14. Upon forward motion of the collet 26 the fingers 25 are freed to expand to their normal condition in which they release the surface 12.

Both the front and rear work gripping devices are operated by a chuck actuating member 29 that has a cylindrical bearing surface 31 on which it shifts axially relative to the chuck body. It is shifted by means of a draw bar, not shown, which may be connected to its threaded end 32. It has a keyway 33 in which engages a key 34 for holding it against turning in the body. The actuating member 29 is connected to the collet 26 of the rear contractible device by a headed screw 35 whose shank is of sufficient length to provide a play connection. Member 29 has a peripheral flange 36 for abutment (through the intermediary of a washer ring 37) with rearwardly facing shoulders 38 on rods 39 which extend through circularly arranged openings that extend in an axial direction through the body section 14. The rods are screw threaded to the movable member 17 of the front contractible device.

Extending around the actuating member 29 and abutting the rear face of its flange is a ring 41. It has circularly arranged openings through which pass the rods 39. A washer 42, similar in shape to ring 41, also has openings which pass rods 39 and is arranged to seat against threaded nuts 43 which form abutments on the rear ends of the rods. Springs 44 are provided on rods 39 and on dummy rods 45 that are threaded into ring 41. These springs preferably are compressed between washer 42 and ring 41 in all positions of the actuating member 29 but of course are most compressed when it is in its rearmost limit position.

The work piece is inserted in the chuck when the actuating member is in its forward limit position. Then both gripping devices are in release position. The flange 36 acting through washer 37 holds the rods 39, and hence also the member 17, in foremost position, against the resistance of springs 44. Front face 46 of the actuating member holds the collet 26 in its foremost position.

As the draw bar moves the actuating member 29 rearwardly, the rods 39 and member 17 follow the flange 36 causing the front gripping device to grasp and pull in the work piece as hereinbefore described. After the front device has stopped rearward motion of the rods, any continued motion of the actuating member results in further compression of springs 44 and hence further tightening of the grip on surface 11 of the work piece.

The action of the rear contractible device on work piece surface 12 follows after contraction of the front contractible device because of the play connection between the actuating member 29 and the rear collet 26. However once the play is taken up, when the head of screw 35 engages the collet, the latter is pulled rearwardly with the full force of the draw bar, less of course the portion of the draft exerted on the front contractible device. Accordingly the surface 12 of the work piece is firmly gripped. It will be noted that this gripping action is accompanied by rearward motion of the collet 26 so that there is a further tendency to draw and hold the head 10 of the work piece firmly against the front face of the chuck.

The springs 44 act as equalizing means which enable both the front and rear contractible devices to grip the work firmly irrespective of irregularity or departure from standard of the diameters of work piece surfaces 11 and 12.

Openings are provided in actuating member 29 and screw 35 to bleed air to and from the chuck interior to insure easy insertion and removal of the work. If desired the interior of the chuck may be kept clean of chips and other unwanted material by means of compressed air, oil or other fluid introduced into it through these openings from any suitable source, not shown. Ingress of unwanted material into the spaces within the gripping devices is discouraged by flexible sealing rings 48 disposed in grooves in the nose section 13 of the chuck body and in the collet 16; and by flexible seals 49 interposed in slots between the active and dummy fingers of the collets. As shown in Fig. 4 these slots extend axially and terminate in drilled holes 51. The walls of the slots and holes do not extend radially of the collet axis but extend in the direction which the active fingers 19 and 25 flex to contract the collets. Accordingly the radial motion of the active fingers does not tend to compress or squeeze out the seals 49, but the fingers merely wipe or slide across the seals. The faces of slots on the dummy fingers are grooved, as indicated at 52, these grooves and the holes 51 forming anchorages for the seals 49. The latter may be formed of suitable plastic material by dipping the collets into the material while it is in a molten condition, withdrawing the collets and allowing the plastic to harden, and then scraping the excess plastic off of the outer and inner curved surfaces of the collets.

Figure 6:
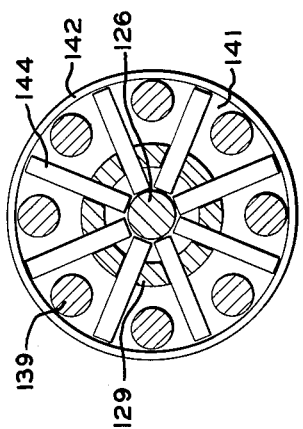
Fig. 6 is a transverse section taken on line 6—6 of Fig. 5.

In the form of the invention shown in Figs. 5 and 6, the front portion of the chuck, including the front contractible device and also the front or gripping portion of the rear collet, may be of the same construction described in connection with Figs. 1 to 4, inclusive, or of the construction to be described hereinafter in connection with Fig. 7. However a different means, means which does not employ springs such as coil springs 44, is employed to distribute the draw bar pull to the rear collet and the rods which operate the front contractible device. As shown in Figs. 5 and 6, these rods, designated 139, extend through openings in a ring 141 and they have heads which abut the rear face of the ring. The latter has a peripheral flange 142 to retain equalizing levers 144 whose outer ends bear on the forward surface of the ring 141 proper. The levers extend through radial slots 145 in the cup shaped body of the actuating member 129.

The levers 144 bear against, are fulcrumed upon, the rearwardly facing surfaces at the fronts of the radial slots 145. The inner ends of the levers abut a forwardly facing annular shoulder 140 on the stem of rear collet 126. A collar 136 screwed to the actuating member is adapted to abut the heads of rods when the actuating member is moved forwardly. The actuating member is kept from turning by a key 134 engaging in way 133. When moved forwardly the front surface 146 of the actuating member is adapted to abut a shoulder 147 of the rear collet 126.

In operation the levers 144 are carried with the actuating member 129 as the latter is moved rearwardly by the draw bar. The levers distribute this movement to the ring 141 (and through it to rods 139), to effect contraction of the front contractible device, and to the collet 126 to cause contraction of the rear contractible device. Upon forward movement of the actuating member, its collar 136 and forward surface 146 respectively abut and shift forwardly the rods 139 and rear collet 126, thereby positively effecting release of both the front and rear contractible devices.

Figure 7:
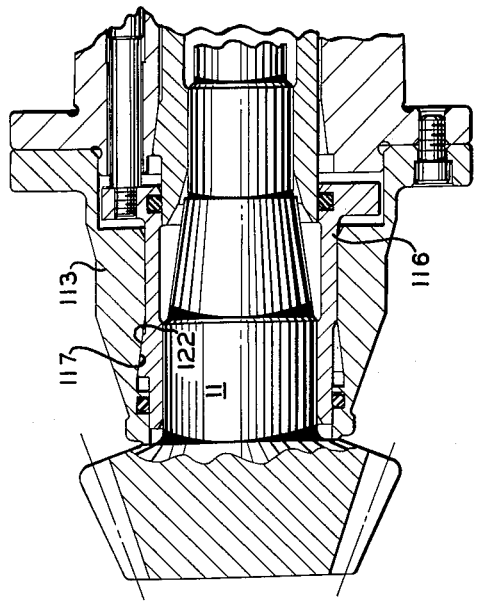

In the modification shown in Fig. 7 the nose section of the body, designated 113, is provided with a rearwardly converging internal tapered surface 117. Slidable axially within the nose section is a contractible collet 116 having its active fingers provided with complementary tapered surfaces 122, so that as the collet is moved rearwardly these fingers are flexed inwardly to grip surface 11 of the work piece. The collet has a rear flange to which the rods 39 are screw threaded.

As will be seen from Fig. 7, the nose of the chuck may be of somewhat smaller diameter than in the form shown in the left part of Fig. 1, and hence may be more desirable in cases where the root diameter and root angle of the pinion is unusually small. However, the form of chuck nose shown in Fig. 1 is otherwise preferred because, due to the motion of part 16 provided by springs 18, it will pull the pinion inwardly through a greater distance to cause the pinion head to positively seat on the chuck nose upon rearward motion of the draw bar. This is advantageous in cases where the head of the work is not held against or almost against the chuck nose at the time the draw bar pull is applied.

The foregoing description of preferred embodiments of the invention has been made by way of illustration and example and not by way of limitation, for it will be understood by those skilled in the art that a number of modifications may be made, in addition to those herein specifically explained, without departing from the spirit of my invention or from the scope thereof as defined by the appended claims.

I claim as my invention:

1. A chuck comprising a tubular body, front and rear contractible devices in said body, each device including a member movable axially relative to the body in a forward direction to effect expansion of the device and in a rearward direction to effect contraction of it, a plurality of rods extending rearwardly from said member of the front device through openings in said body, a chuck actuating element shiftable axially of the body, said element being so arranged relative to said rods and said member of the rear device that when shifted forwardly it moves them forwardly for causing both of said devices to expand, and said element having connection with said rods and said rear device for moving them rearwardly to cause contraction of both of said devices, said connection including equalizing means whereby the devices may contract unequally to compensate for variations in the diameters of a work piece that are gripped respectively by the devices.

2. A chuck according to claim 1 wherein the equalizing means comprise spring means effective between the chuck actuating element and said rods.

3. A chuck according to claim 2 having a ring extending around the chuck actuating element and having openings passing said rods, and a spring on each of said rods for compression between the ring and abutments on the rods for urging the latter rearwardly, and the ring being arranged to be moved rearwardly by the chuck actuating element.

4. A chuck according to claim 1 wherein the equalizing means include levers disposed around the clutch actuating element and arranged to be moved rearwardly by the latter, said levers having outer end portions arranged to transmit rearward motion to said rods and inner end portions arranged to transmit such motion to said member of the rear device.

5. A chuck according to claim 4 in which the rods have abutments adjacent the rear ends thereof and there is a ring extending around said chuck actuating element having openings passing said rods, the ring being disposed between said outer end portion of the levers and said abutments on the rods for transmitting rearward motion from the levers to the rods.

6. A chuck according to claim 5 in which the chuck actuating element has recesses extending therethrough in a substantially radial direction and each lever extends through one of said recesses and fulcrums on a rearwardly facing surface thereof.

7. A chuck according to claim 1 in which said member of the front device is provided with a forwardly converging tapered internal surface, and the front device has a contractible collet with an internal bore for engaging the work and a tapered external surface substantially complementary to said internal surface, and spring means disposed between the body and said collet to urge the latter forwardly, whereby upon rearward movement of said member the collet will contract to grip the work and then draw it into the chuck.

8. A chuck comprising a tubular body, front and rear contractible devices in said body, each device including a member movable axially of the body in a forward direction to effect expansion of the device and in a rearward direction to effect contraction of it, resilient means for yieldably urging said member of the forward device rearwardly, a chuck actuating element connected with said member of the rear device for moving it forwardly and rearwardly, and said element being so arranged relative to said member of the front device that when said element is moved forwardly the member is moved by it also in a forward direction.

9. A chuck according to claim 8 in which the chuck actuating element is connected with said member of the rear device by a play connection, whereby upon rearward motion of the actuating element the front device will contract before the rear device.

10. A chuck according to claim 8 in which said member of the front device is provided with a forwardly converging tapered internal surface, and the front device has a contractible collet with an internal bore for engaging the work and a tapered external surface substantially complementary to said internal surface, and spring means disposed between the body and said collet to urge the latter forwardly, whereby upon rearward movement of said member the collet will contract to grip the work and then draw it into the chuck.

11. A chuck comprising a tubular body, front and rear contractible devices spaced axially in said body, each device including a member movable axially relative to the body in a forward direction to effect expansion of the device and in a rearward direction to effect contraction of it, a plurality of rods extending rearwardly from said member of the front device through openings in said body, spring means for urging the rods rearwardly, a chuck actuating element shiftable axially of the body and connected with said member of the rear device for moving it in both directions, and said chuck actuating element being so arranged relative to said rods that when moved forwardly it moves them forwardly.

12. A chuck according to claim 11 in which there is a ring coaxial with the clutch actuating element and arranged for rearward movement by it, and said spring means comprise a coil spring arranged on each rod for compression between a rearwardly facing surface of said ring and an abutment on the rod.

13. A chuck according to claim 12 in which the rods have rearwardly facing abutments forward of the ring, and the chuck actuating element has a flange disposed between said abutments and the ring.

14. A chuck according to claim 11 in which the chuck actuating element is connected with said member by a play connection, whereby upon rearward motion of the actuating element the front collet will contract before the rear collet.

15. A chuck comprising a body having a nose section with an axially extending internal surface and a tail section adapted to fit into a machine work spindle, said tail section having circularly arranged openings extending therethrough in an axial direction, a tubular member slidable axially on said internal surface, a draw bar attaching member at the rear of said tail section, rods extending through said openings and connecting said members for axial movement in the same direction, the tubular member having a forwardly converging internal tapered surface, and a contractible collet within said tubular member and having outer complementary tapered surface portions for wedge engagement with the tubular member upon rearward movement of the latter.

16. A chuck according to claim 15 in which the collet comprises a tubular body axially slotted at one end to provide alternate active fingers and dummy fingers, the active fingers having said complementary tapered surface portions to effect inward radial flexure of them upon rearward movement of said tubular member, the slot sides of each active finger being plane surfaces extending in the direction of the radial flexure of the finger, the slot sides of the dummy fingers having grooves extending therealong, and sealing material in said slots and grooves.

17. A flexible collet comprising a tubular body axially slotted at one end to provide alternate active fingers and dummy fingers, the active fingers being adapted to flex radially to change the effective diameter of the collet, sealing material in the slots between the fingers, the slot sides of each active finger being plane surfaces extending in the direction in which the finger flexes, and the slot sides of the dummy fingers being grooved to provide anchorages for the sealing material.

References Cited in the file of this patent

UNITED STATES PATENTS

| | | |
|---|---|---|
| 2,227,620 | Armitage et al. | Jan. 7, 1941 |
| 2,354,966 | Panza et al. | Aug. 1, 1944 |
| 2,562,455 | Gridley | July 31, 1951 |
| 2,574,754 | Peters | Nov. 13, 1951 |

FOREIGN PATENTS

| | | |
|---|---|---|
| 175,089 | Great Britain | Feb. 16, 1922 |